United States Patent [19]

Lang

[11] Patent Number: 4,951,129

[45] Date of Patent: Aug. 21, 1990

[54] DIGITAL PREFILTERING OF ENCODED VIDEO SIGNALS

[75] Inventor: Stuart E. Lang, Montville, N.J.

[73] Assignee: Dubner Computer Systems, Inc., Paramus, N.J.

[21] Appl. No.: 294,235

[22] Filed: Jan. 9, 1989

[51] Int. Cl.[5] ........................................ H04N 9/78

[52] U.S. Cl. ........................................ 358/31

[58] Field of Search ........................................ 358/31

[56] References Cited

U.S. PATENT DOCUMENTS

| | | | |
|---|---|---|---|
| 4,656,502 | 4/1987 | Hausdorfer | 358/31 |
| 4,683,490 | 7/1987 | Strolle et al. | 358/31 |
| 4,731,660 | 3/1988 | Faroudja et al. | 358/31 |

FOREIGN PATENT DOCUMENTS

| | | | |
|---|---|---|---|
| 98883 | 5/1987 | Japan . | |
| 2072991 | 10/1981 | United Kingdom | 358/31 |

OTHER PUBLICATIONS

Faroudja et al., Improving NTSC to Achieve Neat-RGB Performance, SMPTE Journal, Aug. 1987, pp. 750–761.

*Primary Examiner*—John W. Shepperd
*Attorney, Agent, or Firm*—Francis I. Gray

[57] ABSTRACT

Digital prefiltering of luminance and chrominance components for an encoded video signal is performed to prevent cross color and dot crawl errors when the encoded video signal is decoded. The luminance component is filtered using a two- or three-dimensional chrominance bandpass filter to generate luminance correction limiting values corresponding to cross color errors that would occur when a conventionally encoded video signal is decoded. The luminance component also is filtered individually in each dimension, horizontally, vertically and/or temporally, to obtain luminance dimensional correction values. From the luminance correction limiting values and corresponding luminance dimensional correction values, luminance correction values are obtained by a two step decision process. The luminance correction values are added to the luminance component to provide the prefiltered luminance component. In like manner chrominance correction limiting values and chrominance dimensional correction values are generated and used to obtain chrominance correction values that are added to the chrominance component to provide the prefiltered chrominance component. The prefiltered components are combined, along with synchronizing signals, to produce the encoded video signal.

14 Claims, 7 Drawing Sheets

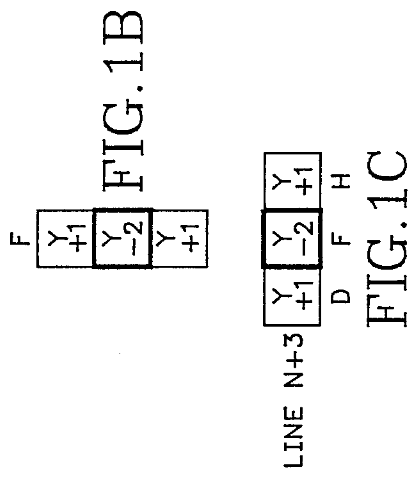
FIG. 1B
FIG. 1C
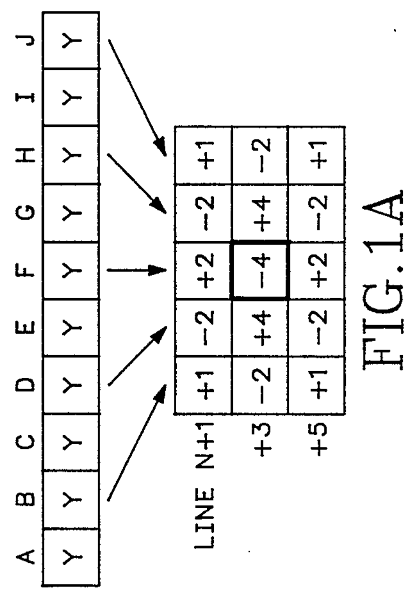
FIG. 1A
FIG. 5B
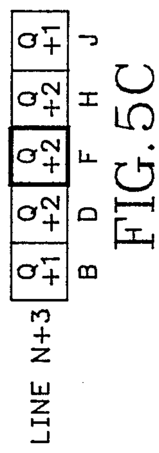
FIG. 5C
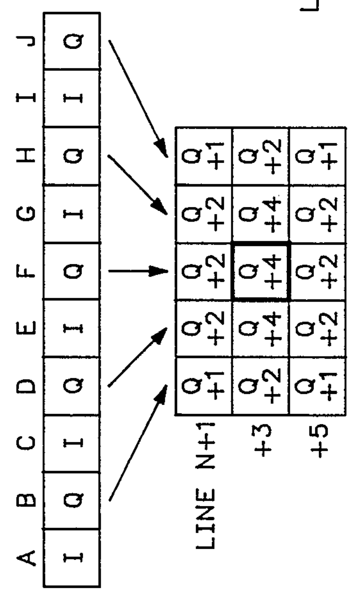
FIG. 5A

| $Y_{CX}=$ | $Y_{CV}<Y_{CH}$ | $Y_{CV}\geq Y_{CH}$ |
|---|---|---|
| $Y_{CC}\geq 0$ | $Y_{CV}$ | $Y_{CH}$ |
| $Y_{CC}<0$ | $Y_{CH}$ | $Y_{CV}$ |

FIG. 2

| C= | $Y_{CC}<Y_{CX}$ | $Y_{CC}\geq Y_{CX}$ |
|---|---|---|
| $Y_{CC}(+)$ AND $Y_{CX}(+)$ | $Y_{CC}$ | $Y_{CX}$ |
| $Y_{CC}(-)$ AND $Y_{CX}(-)$ | $Y_{CX}$ | $Y_{CC}$ |
| $Y_{CC}(-)$ X OR $Y_{CX}(-)$ | ZERO | ZERO |

FIG. 3

| A | B | C | D | E | F | G | H | I | J |
|---|---|---|---|---|---|---|---|---|---|
| Y+I | Y+Q | Y−I | Y−Q | Y+I | Y+Q | Y−I | Y−Q | Y+I | Y+Q |

FIG. 7

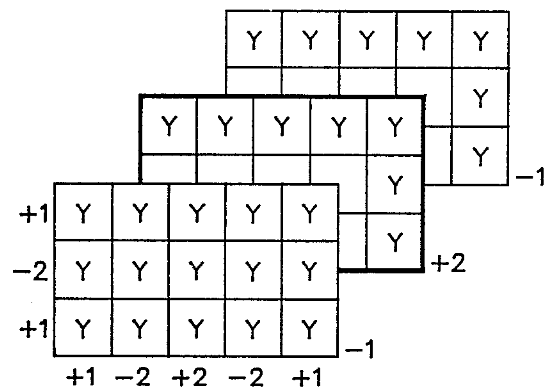
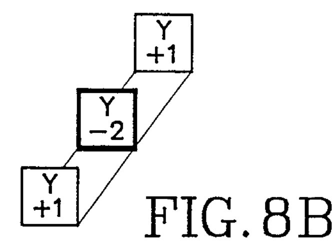
FIG. 8A
FIG. 8B
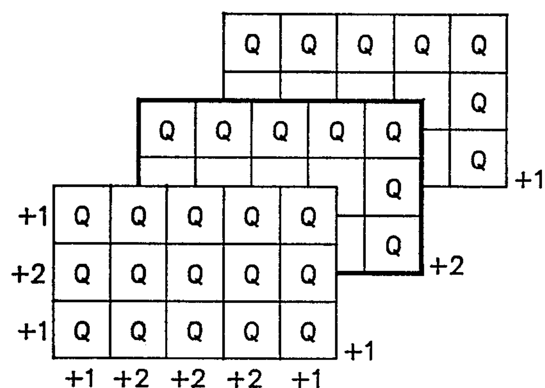
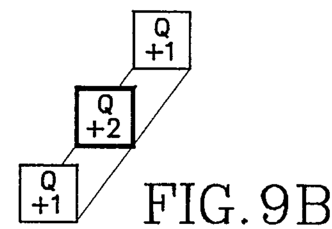
FIG. 9A
FIG. 9B

DIGITAL PREFILTERING OF ENCODED VIDEO SIGNALS

BACKGROUND OF THE INVENTION

The present invention relates to digital signal processing, and more particularly to the digital prefiltering of encoded video signals to minimize cross color and dot crawl errors when the encoded video signals are subsequently decoded.

An encoded video signal has a chrominance component, formed by modulating quadrature components of a subcarrier frequency, and a luminance component that is added to the chrominance component. Two major types of errors occur when such an encoded video signal is decoded: cross color errors where luminance energy is added to the decoded chrominance component, and dot crawl errors where chrominance energy is added to the decoded luminance component. Diagonal luminance patterns at or near the color subcarrier frequency are impossible to properly decode, with some or all of the energy being mistaken for chrominance information regardless of the type of decoder being used. Dot crawl errors caused by chrominance transitions are somewhat easier to minimize in the decoder, but in practice they cannot be entirely eliminated. Large magnitude chrominance changes with fast risetimes produce the most dot crawl errors when the signal is decoded. Simple single (1H) or double (2H) horizontal line comb decoders do reduce cross color errors while preserving luminance detail, but cross color errors are still often visible. The dot crawl errors on horizontal lines and edges are a side effect of the comb filtering. Such introduced dot crawl errors are reduced by placing a subcarrier notch filter in the path of the decoded luminance component, but this softens detail. What is desired is a method of encoding the luminance and chrominance components within an encoder to reduce errors when the encoded video signal is decoded without any unnecessary loss of detail in the image represented by the encoded video signal.

SUMMARY OF THE INVENTION

Accordingly the present invention provides a digital prefiltering of the luminance and chrominance components of an encoded video signal in a digital encoder to reduce cross color and dot crawl errors when the encoded video signal is subsequently decoded for viewing. Digitized luminance and chrominance components are individually prefiltered before they are combined into the encoded video signal. The luminance component is first filtered by a multi-dimensional digital chrominance bandpass filter having a response similar to a 2H comb filter that treats the luminance component as two separate, but interleaved, luminance signals corresponding to the interleaved I and Q chrominance signals from the chrominance component to indicate the magnitude of the cross color error to be eliminated while isolating the error to the related chrominance signal. The luminance component also is filtered in each dimension by simple chrominance bandpass filters to provide potential filter values, one of which is selected as a correction value for the luminance component. The correction value is clipped by the value indicating the magnitude of the cross color error from the first filter, and the resulting correction value is added to the luminance component.

The chrominance component is filtered by a multidimensional digital lowpass filter to obtain a magnitude value representative of dot crawl error to be eliminated. The chrominance component also is filtered by a chrominance filter in each dimension to provide potential filter values, one of which is selected as a correction value for the chrominance component. The correction value is clipped by the magnitude value and added to the chrominance component to accomplish the desired prefiltering. The filtered luminance and chrominance components are then combined conventionally to produce the encoded video signal for broadcast to a receiver where it is subsequently decoded for viewing without the presence of cross color and dot crawl errors while preserving the image detail.

The objects, advantages and other novel features of the present invention are apparent from the following detailed description when read in conjunction with the appended claims and attached drawing.

BRIEF DESCRIPTION OF THE DRAWING

FIGS. **1*a*-1*c*** are illustrations of weighted digital filters for the luminance component according to the present invention.

FIG. 2 illustrates a first decision process for determining the luminance correction values from the digital filter outputs according to the present invention.

FIG. 3 illustrates a second decision process for determining the luminance correction values from the digital filter outputs according to the present invention.

Figure 4A:
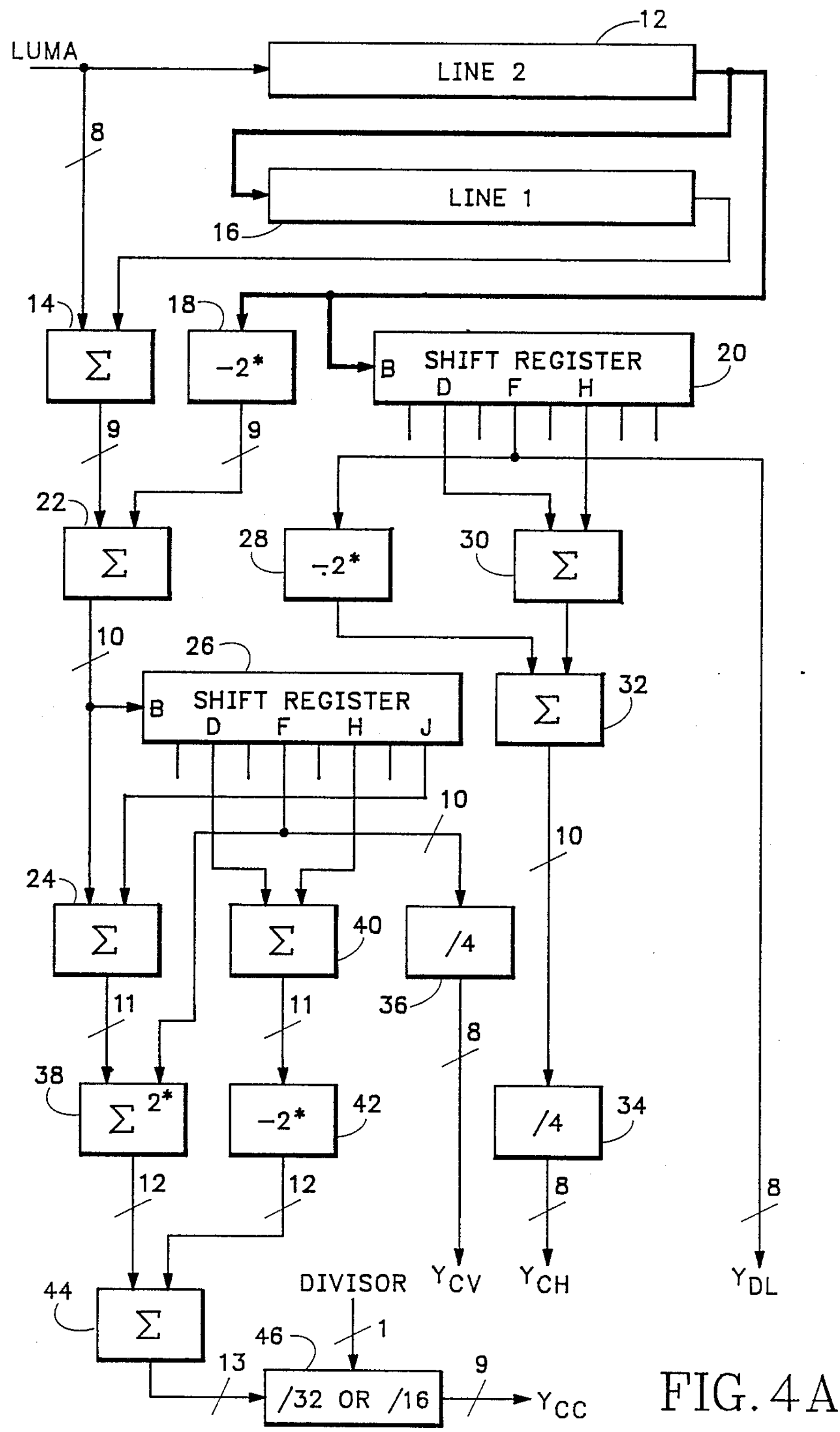

FIGS. **4*a*-4*b*** are block diagrams of the luminance prefiltering according to the present invention.

FIGS. **5*a*-5*b*** are illustrations of weighted digital filters for the chrominance component according to the present invention.

FIGS. **6*a*-6*b*** are block diagrams of the chrominance prefiltering according to the present invention.

FIG. 7 is an illustration of a portion of a digital encoded video signal.

FIGS. **8*a*-8*b*** are illustrations of weighted digital filters for the luminance component extended into three dimensions according to the present invention.

FIGS. **9*a*-9*b*** are illustrations of weighted digital filters for the chrominance component extended into three dimensions according to the present invention.

DESCRIPTION OF THE PREFERRED EMBODIMENT

In an encoder RGB signals from a video camera, for example, or other suitable video source are converted into YIQ signals. The Y (luminance) signal is low pass filtered to just under twice the color subcarrier frequency and then digitized at four times the subcarrier frequency at the peaks and zeros of the subcarrier frequency. The I and Q signals are filtered to the appropriate television standard specification and then multiplexed together to form a chrominance signal having alternating I and Q digitized samples. The chrominance signal is sampled at four times the subcarrier frequency which is equivalent to twice the subcarrier frequency for each I and Q component. The resulting digitized luminance and chrominance signals are now ready for digital prefiltering according to the present invention. After prefiltering, the chrominance signal is modulated by two's complementing alternate pairs of I and Q samples and then adding the modulated chrominance signal to the luminance signal. The final step is to insert digital sync information to produce a digital encoded video signal that can be converted to conventional analog form. Although a digital encoder is described, an analog equivalent could also be implemented.

The filtering of the luminance signal presents the more difficult problem since any luminance transition produces some cross color error, and eliminating all cross color error effectively eliminates all detail. To effect a reduction of cross color error while preserving detail three filters are used in the luminance filter processing. The first filter is illustrated in FIG. 1*a* where the top row illustrates luminance samples in one horizontal line taken at four times the subcarrier frequency. Alternate samples from each of three successive horizontal lines within the same video field corresponding to the same chrominance component, either I or Q, are processed to produce a 3×5 filter for the center, or current, pixel indicated by the heavy border. The numbers in each filter box indicate the weights that are applied to each pixel. The weighted pixels are added together and the resulting sum is divided by either 32 or 16 to produce a value Ycc. In the absence of diagonal lines Ycc is at or near zero, but for diagonal lines or edges Ycc is significantly greater than zero. Since diagonal lines and edges produce the greatest cross color errors in decoding, Ycc is a measure of such errors.

This first filter is a two-dimensional chrominance bandpass filter having a response similar to that of a 2H comb filter. However this filter treats the luminance signal as two separate, but interleaved, luminance signals corresponding to the two separate, but interleaved, chrominance signals, I and Q. A cross color error often affects one chrominance signal (I or Q) to a greater extent than the other. For example, a fine diagonal line passing through only the area occupied by the Q chrominance signal produces a cross color error in the decoded Q component but not in the decoded I component. Of course in reality due to the bandwidth limitation of the luminance signal the sides of the diagonal line do extend into the I channel on both sides, but the amplitude peaks in the Q channel so the amplitude is much larger in the Q channel than the I channel, i.e., the cross color error in the Q channel is greater than the cross color error in the I channel. Thus the described chrominance bandpass filter provides an accurate indication of the magnitude of the cross color error to be eliminated while isolating the error to the related chrominance component. The value Ycc is used to limit the filtering that is subsequently applied to the luminance signal. Division by 16 instead of 32 produces twice the magnitude to allow an even greater reduction of cross color error in the decoded image with a little more softening of detail, and is appropriate for broadcast applications since a typical consumer television receiver is more sensitive to cross color error and has a poorer quality decoder than for non-broadcast applications, such as within studios. Further, for NTSC broadcasts where the NTSC signal is further bandwidth limited, the additional softening is less noticeable.

The second and third luminance filters are illustrated in FIGS. 1*b* and 1*c*. The second filter is a simple vertical chrominance bandpass filter having an output value Ycv, and the third filter is a horizontal equivalent to the second filter having an output value Ych. These output filter values Ycv, Ych are used in a decision process to determine the final filter value Ycx for the luminance signal. These filters only use adjacent pixels to keep blurring to a minimum, i.e., to minimize softening of detail. Again only luminance pixels related to the same chrominance component are used as discussed above.

Ycv and Ych may each be either positive or negative numbers, as is also true for Ycc. As shown in FIG. 2 if Ycc is a negative number, the more positive value of Ycv or Ych is assigned to Ycx, which itself may be either positive or negative. If Ycc is non-negative, then the more negative value of Ycv or Ych is assigned to Ycx. The next step as shown in FIG. 3 is to limit the value of Ycx between zero and Ycc. If Ycx is within the limits of Ycc and zero, Ycx is the correction value. Otherwise Ycx is clipped to Ycc or zero. The resulting correction value is added to the current luminance pixel to accomplish the prefiltering of the luminance signal. These decisions keep softening of the luminance signal to a minimum while effectively removing information that produces cross color error. Ycc is nearly always at or near zero since most picture material does not produce significant cross color error when decoded, as are either Ycv or Ych or both. A vertical edge or line results in a large Ych value, but both Ycv and Ycc are at or near zero. A horizontal edge or line produces a large Ycv value and small Ych and Ycc values. Diagonal edges produce large values for both Ycv and Ych, but a smaller value for Ycc, while diagonal lines produce relatively large values for all three, with Ycc often the smallest. Either the correction of smallest magnitude or a correction of zero is used, resulting in limiting the prefiltering of the luminance signal to those pixels of the picture that require it and to the magnitude required. Note that Ycc is obtained from a filter that covers a two dimensional area and may be negative at the same time that Ych or Ycv or both are positive numbers. In that case the current pixel is not contributing to the cross color problem but is helping to reduce the cross color error, and thus should be left alone. As shown in FIGS. 2 and 3 the decision process does precisely this since whenever either Ycv or Ych or both are opposite in polarity to Ycc, Ycx is clipped to zero, further preventing unnecessary softening of details within the luminance signal.

Referring now to FIG. 4*a* a hardware implementation of the luminance prefiltering is illustrated. The digitized luminance signal LUMA, sampled at four times the chrominance subcarrier frequency, is input to a first 1H delay line 12 and to a first summing circuit 14. The output of the first 1H delay line 12 is input to a second 1H delay line 16, to a first multiplying circuit 18 that weights the output by −2, and to a first shift register 20. The output of the second 1H delay line 16 is input to the first summing circuit 14, the output of which is input to a second summing circuit 22 together with the output of the first multiplying circuit 18. The output of the second summing circuit 22 is input to a third summing circuit 24 and to a second shift register 26, and represents the summing of three consecutive horizontal lines of the luminance signal according to the vertical weighting factors (1, −2, 1) indicated in FIG. 1*a*.

The shift registers 20, 26 are clocked by the sampling frequency, with outputs taken from alternate samples corresponding to luminance samples for the same I or Q chrominance components as discussed above. The center output F of the first shift register 20 corresponds to the current pixel delayed by one horizontal line Ydl, and is input to a second multiplying circuit 28 that weights the value by −2. The outputs D, H on either side of the center output are summed in a fourth summing circuit 30, the output of which is input to a fifth summing circuit 32 together with the output of the second multiplying circuit 28. The output of the fifth summing circuit 32 is input to a first divider circuit 34 to produce the horizontal correction value Ych, and represents the horizontal filtering (1, −2, 1) illustrated by FIG. 1*c*.

The center output F from the second shift register 26 represents the vertical filtering (1, −2, 1) illustrated by FIG. 1*b*, and is input to a second divider circuit 36 to produce the vertical correction value Ycv, and to a sixth summing circuit 38 with a weighting factor of two. The last output J from the second shift register 26 is input to the third summing circuit 24 to produce an output that also is input to the sixth summing circuit 38. The outputs D, H on either side of the center output of the second shift register 26 are input to a seventh summing circuit 40, the output of which is weighted by −2 in a third multiplying circuit 42. The outputs of the sixth summing circuit 38 and the third multiplying circuit 42 are input to an eighth summing circuit 44 to produce a two dimensionally filtered output, the summing circuits 24, 38, 40, 44 applying the horizontal weights (1, −2, 2, −2, 1) shown in FIG. 1*a* to the luminance signal. The resulting output of the eighth summing circuit 44 is input to a third divider 46 having a selectable divisor determined by the status of a DIVISOR command to produce the chrominance correction value Ycc.

Figure 4B:
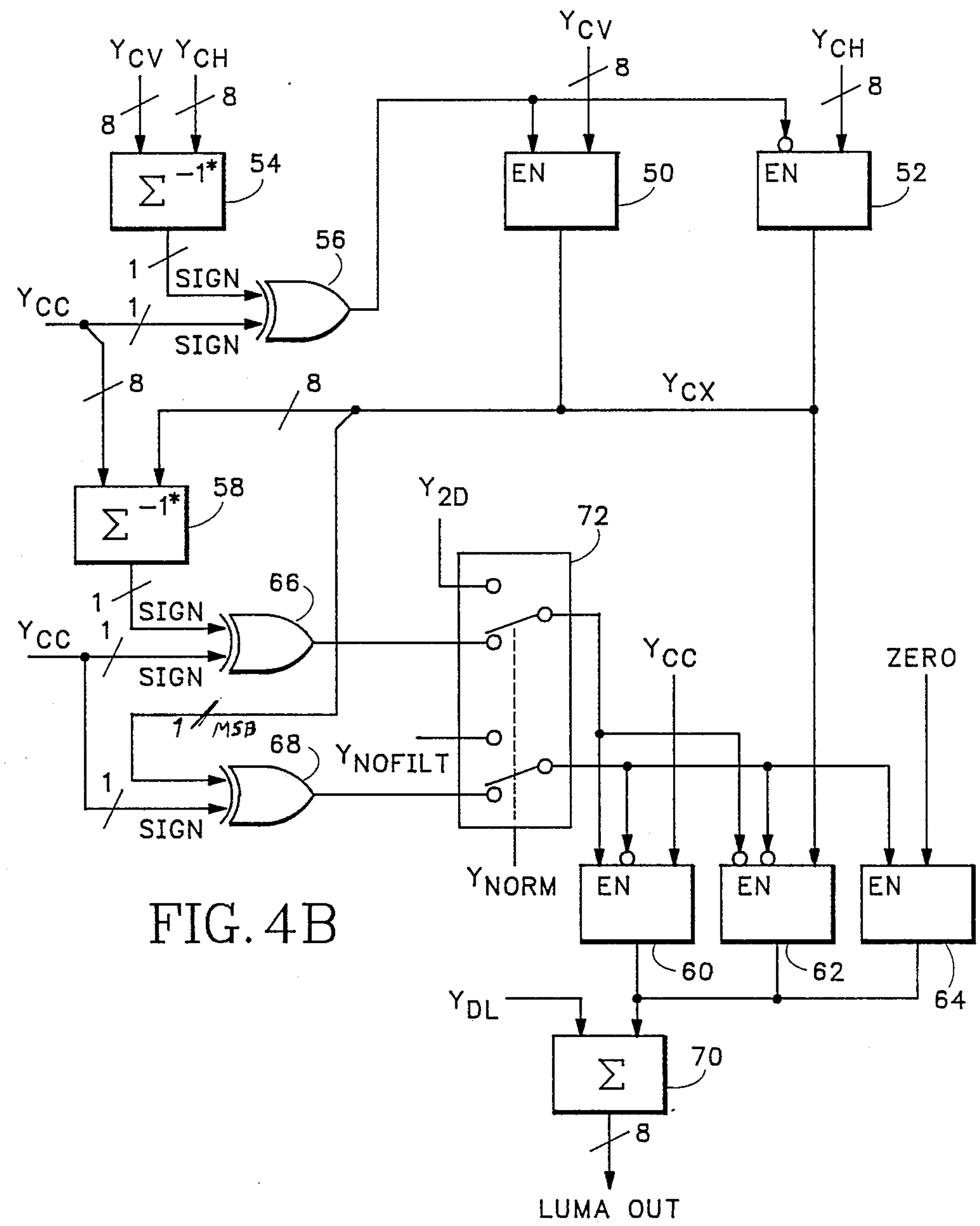

The decision process is illustrated in FIG. 4*b* where Ych and Ycv are input to respective gates 50, 52 and to a first subtracting circuit 54. The sign of the output of the first subtracting circuit 54 and the sign of Ycc are input to a first exclusive OR gate 56 to generate an enable signal for the gates 50, 52. If the signs are opposite, then Ycv becomes Ycx, and if the signs are the same, then Ych becomes Ycx as illustrated by FIG. 2. Ycc, Ycx and ZERO are input to respective gates 60, 62, 64 that form a limiting circuit. Ycx and Ycc also are input to a second subtracting circuit 58. The sign of the output of the second subtracting circuit 58 is compared with the sign of Ycc by a second exclusive OR gate 66 to generate a first enable signal for gates 60, 62, and the signs of Ycx and Ycc are compared by a third exclusive OR gate 68 to generate a second enable signal for gates 60, 62, 64. Depending upon the enable signals, either Ycc, Ycx or ZERO are passed by gates 60, 62, 64 to a ninth summing circuit 70 for combination with the unfiltered luminance signal Ydl to produce the prefiltered luminance signal LUMA_OUT. A switch 72 interposed between the first and second enable signals and gates 60, 62, 64 provide a means in response to a command Ynorm to manually determine which correction value is output from the gates according to Y2*d* and Ynofilt signals that are substituted for the enable signals. Thus if the values Ycx and Ycc are of opposite polarities, the ZERO output from gate 64 is selected, while either Ycc or Ycx are selected according to whether Ycx is outside the limit established by Ycc as illustrated in FIG. 3.

The chrominance signal may be processed in the same manner as the luminance signal with some differences. The desired effect is a lowpass filtering of the chrominance signal, and the I and Q components must have specified horizontal filtering as prescribed by the appropriate encoded television standard, such as NTSC or PAL. Depending upon the application the prefiltering of the chrominance signal may be merely the addition of vertical filtering. However passing the I and Q components through a two-dimensional filter provides the greatest reduction in dot crawl error in the decoded signal with only a very slight reduction in chrominance bandwidth. For studio applications where the decoder is highly sophisticated, it is desirable to process the chrominance signal in a manner similar to that described above for prefiltering the luminance signal.

The first chrominance filter is illustrated in FIG. 5*a*. The top row illustrates the multiplexed chrominance signal with its alternating I and Q samples. The two-dimensional lowpass filter below the top row illustrates the processing using Q samples, which is the same for I samples, and is identical to the luminance filter of FIG. 1*a* except for the polarities of the weights which differ. Because this is a lowpass filter rather than a bandpass filter, the weights are positive, assuming that chrominance has not yet been modulated. The sum of the weighted values is divided by 32, producing the lowpass filtered value for the current pixel. The chrominance correction value Ccc is obtained by subtracting the unfiltered chrominance value for the current pixel Cuf from the filter output, Ccc being the difference between the filtered and unfiltered values.

The vertical chrominance filter is illustrated in FIG. 5*b* and, except for the polarity of the weights, is the same as the corresponding luminance filter of FIG. 1*b*. Again Cuf is subtracted from the value of the filter output to produce Cfv. Likewise the horizontal chrominance filter is illustrate in FIG. 5*c*. This filter is somewhat different from the corresponding luminance filter of FIG. 1*c* in that the magnitude of the weights used in this filter match the horizontal component of the two-dimensional chrominance filter, incorporating five adjacent pixels instead of three. The resulting output is divided by eight and Cuf is subtracted to produce Cfh. The difference in this filter takes into account the fact that I and Q are already lowpass filtered horizontally. Cfh is a fair indication of the magnitude of dot crawl error that is produced by chrominance changes within a line when the encoded signal is decoded. Dot crawl can appear on vertical edges even when comb filtering is used.

As was described for the luminance signal with respect to FIGS. 2 and 3, the decisions are made to determine the chrominance correction value from values of Ccc, Cfv, Cfh and Cfx corresponding to Ycc, Ycv, Ych and Ycx. The correction value is added to the current chrominance pixel value to accomplish the prefiltering. The effect of this filtering is that only diagonal chrominance information is filtered, which is most desirable when the encoded signal is to be decoded by a sophisticated decoder. However some applications may only require the addition of vertical filtering as discussed above, so the selection of Ccv as the correction value may be forced. For most applications the two-dimensional filtering of the chrominance signal produces the best results, so Ccc may be selected as the correction value.

Figure 6B:
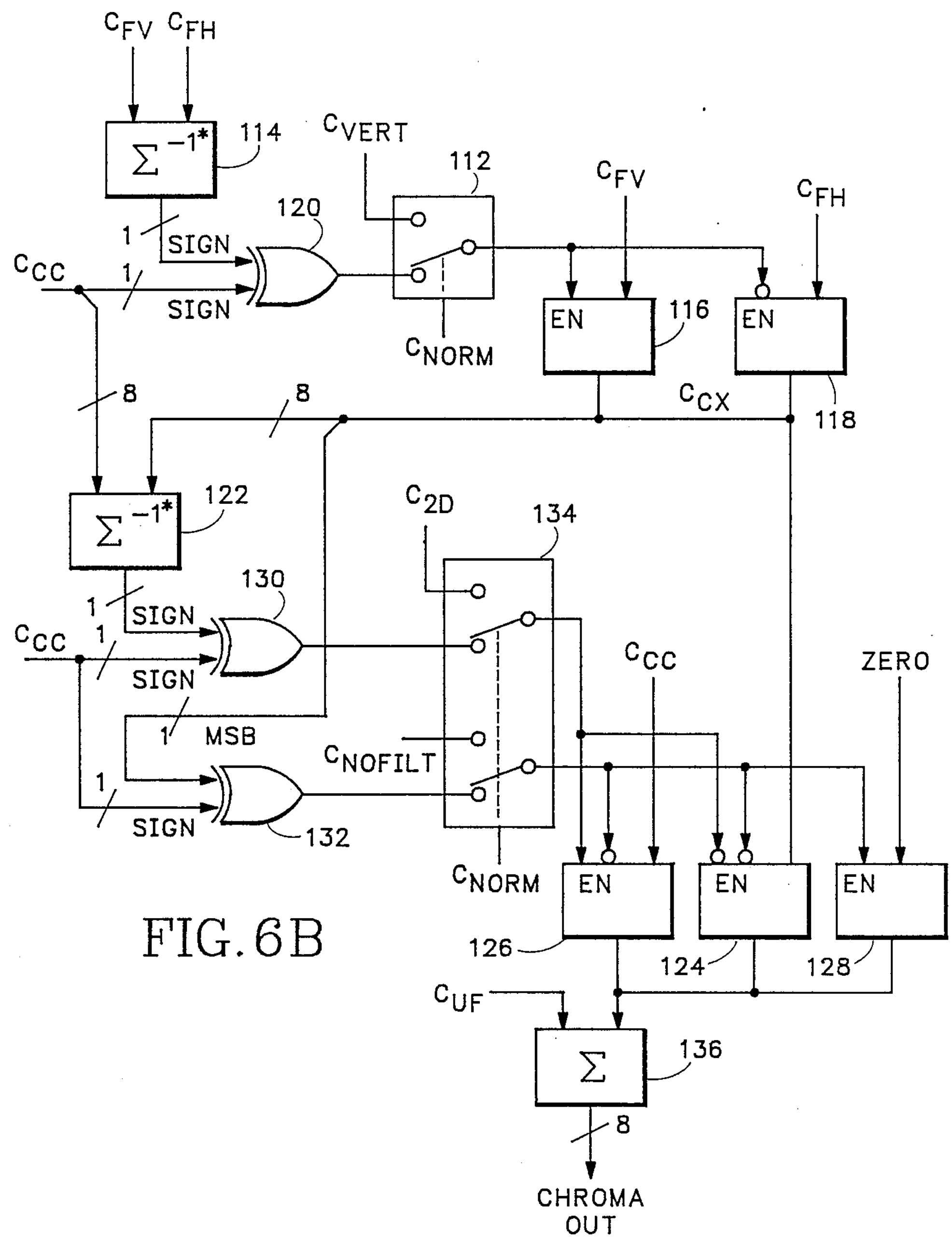
Figure 6A:
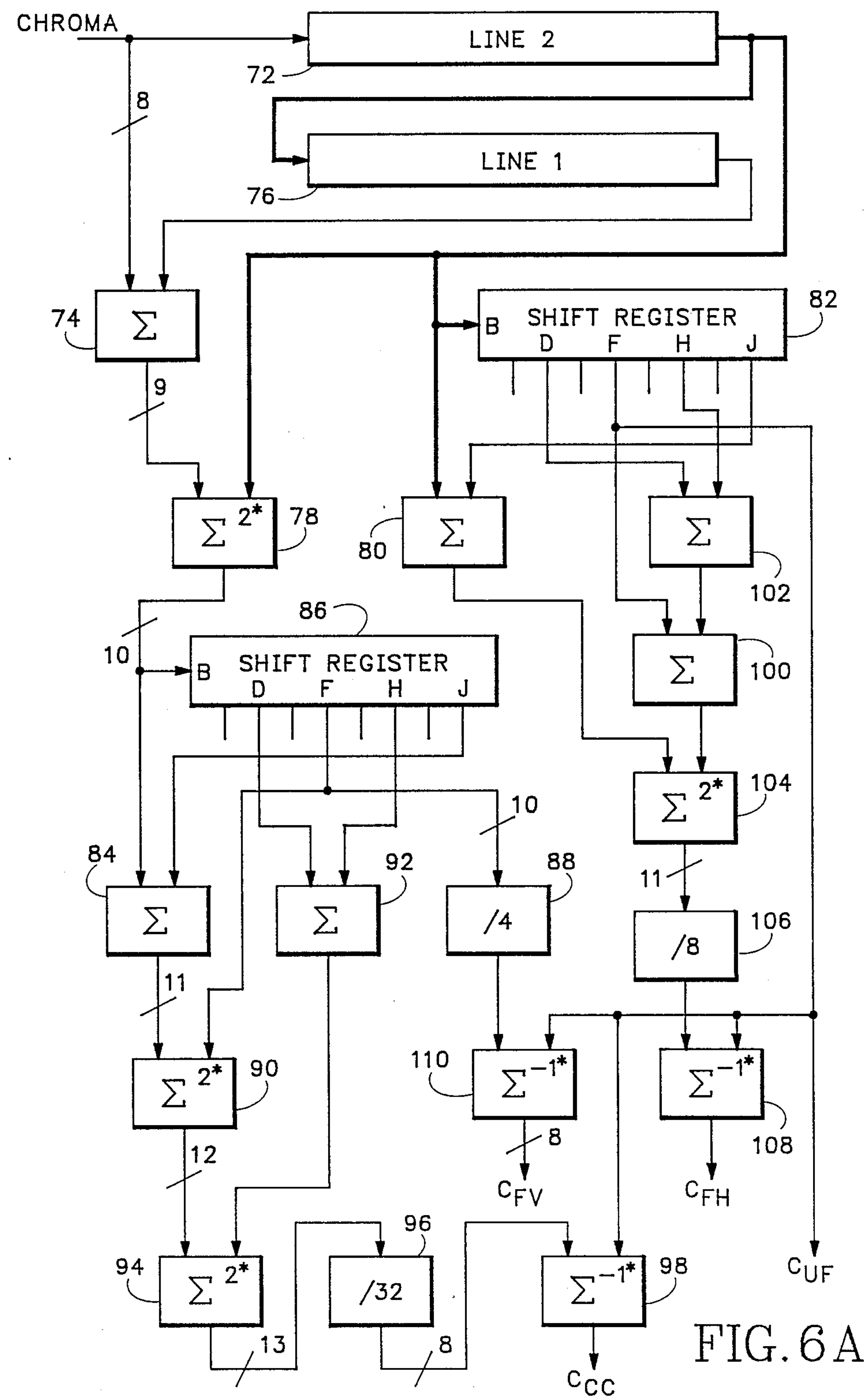

Referring now to FIG. 6*a* the digitized chrominance signal CHROMA is input to a first chrominance 1H delay line 72 and to a first chrominance summing circuit 74. The output of the first chrominance delay line 72 is input to a second chrominance 1H delay line 76, to a second chrominance summing circuit 78 with a weight of two, to a third chrominance summing circuit 80, and to a first chrominance shift register 82. The output of the second chrominance delay line 76 is input to the first chrominance summing circuit 74, the output of which is input to the second chrominance summing circuit 78 to produce the vertical chrominance filtering (1, 2, 1) as illustrated in FIG. 5*a*. The vertically filtered chrominance signal from the second chrominance summing circuit 78 is input to a fourth chrominance summing circuit 84 and a second chrominance shift register 86. The center pixel F from the second chrominance shift register 86 corresponds to the vertically filtered current pixel, and is input to a divider 88 and a fifth chrominance summing circuit 90 weighted by two. The adjacent pixels D, H to the current pixel having the same chrominance component, I or Q, from the second chrominance shift register 86 are added in a sixth chrominance summing circuit 92, the output of which is input to a seventh chrominance summing circuit 94 with a weight of two together with the output from the fifth chrominance summing circuit 90. The output of the seventh chrominance summing circuit 94 is the filtered chrominance signal that is input to a divider 96 to be normalized. The fourth through seventh summing circuits provide the horizontal filtering (1, 2, 2, 2, 1) for the two-dimensional filter as illustrated in FIG. 5*a*. The center pixel F from the first chrominance shift register 82 is the unfiltered chrominance signal that is subtracted from the filtered chrominance signal output from the first chrominance divider 96 by first chrominance subtracting circuit 98 to produce Ccc.

The center pixel F from the first chrominance shift register 82 also is input to an eighth chrominance summing circuit 100. The adjacent corresponding pixels D, H from the first chrominance shift register 82 are combined in a ninth summing circuit 102, the output of which is input to the eighth summing circuit 100. The last pixel J from the first chrominance shift register 82 is added to the input to the shift register in the third chrominance summing circuit 80, the output of which is input to a tenth chrominance summing circuit 104. The output of the eighth chrominance summing circuit 100 is weighted by two and combined with the output of the third chrominance summing circuit 80 to produce the horizontally filtered chrominance signal as illustrated in FIG. 5*c*. The output of the tenth chrominance summing circuit is normalized by a third chrominance divider 106 and input to a second chrominance subtracting circuit 108 where Cuf is subtracted to produce Cfh.

Likewise the center pixel F from the second chrominance shift register 86 is the vertically filtered chrominance signal as illustrated in FIG. 5*b*. The normalized output from the first chrominance divider 88 for the center pixel F is input to a third chrominance subtracting circuit 110 where it is combined with Cuf to produce Cfv.

As shown in FIG. 6*b* the chrominance decision process is identical to the luminance decision process as illustrated in FIG. 4*b* with the addition of a second chrominance switch 112 to force the selection of Cfv as the correction value in those applications where only the additional vertical filtering is desired. Cfv and Cfh are input to subtracting circuit 114 and respective gates 116, 118, the gates being enabled by the output of first chrominance exclusive OR gate 120 according to the signs of Ccc and of the output of the subtracting circuit. The resulting Ccx is input to another subtracting circuit 122 together with Ccc, and to a gate 124. Ccc is input to another gate 126 while ZERO is input to a third gate 128. The gates 124, 126, 128 are enabled by a pair of enable signals from exclusive OR gates 130, 132 via switch 134 that are generated as a function of the signs of Ccc and of the output of the subtracting circuit 122 or of Ccx. The selected chrominance correction value from the gates 124, 126, 128 is added to Cuf in a final summing circuit 136 to produce the prefiltered chrominance signal CHROMA_OUT.

The prefiltered chrominance signal is modulated and added to the luminance signal to produce the encoded signal as illustrated in FIG. 7. For prefiltering a modulated chrominance signal the polarities of some of the chrominance filter weights would be changed. Sync signals are inserted to complete the digital encoded signal, as is well known in the art. The luminance and chrominance signals may be encoded into either the NTSC or PAL standards, the difference being the compensation for the PAL ¼ cycle offsets and the additional horizontal delays for PAL to shift the pixels, both luminance and chrominance, on the lines above and below the current line into proper columns based on chrominance. The sampling is still at four times subcarrier frequency (PAL) and the U and V chrominance components are used.

The vertical filtering described above produces a one line delay in the output from the input. If this is undesirable, the encoder may be adapted to operate with zero line delay by substituting data from the previous line for data that normally comes from the next line. The resulting degradation is noticed as a softening of details, with some details appearing to be stretched downward due to the vertical filtering imbalance. This downward stretch is further accentuated in monitors using a 1H comb filter in the decoder.

The trend toward using digital circuitry in consumer grade televisions and video cassette recorders, together with the decrease in the cost of digital memory, makes three-dimensional filtering using frame comb filters feasible. Rather than use adaptive frame comb filter decoders with the added cost and complexity of the supporting motion detection logic that is required, a non-adaptive, three-dimensional chrominance bandpass filter based on the two-dimensional chrominance bandpass filter described above may be implemented as illustrated in FIG. 8*a* by the additional filtering in the dimension of time. As illustrated, temporal filtering of data from three frames in both the encoder and decoder is preferred, but the temporal filtering could be reduced to two frames in the decoder to reduce the frame memory requirement while still providing an improved image.

Three-dimensional chrominance bandpass filters are more immune to cross color error and such an encoder provides far less filtering of luminance. In fact in areas of the picture that do not move from frame to frame, luminance is not filtered at all. Where there is motion, cross color error reduction in the encoder provides the proper match for the decoder, producing sharp pictures with virtually no cross color errors. Three-dimensional filtering of the chrominance signal as well within the encoder completes the picture. For broadcast the correction from the three-dimensional chrominance filter always is selected in order to minimize dot crawl errors, and any residual errors caused by motion are masked by that motion. Temporal blurring of chrominance is not noticeable due to the temporal filter weighting as well as the chrominance lag of a viewer's vision system. What is noticeable is the dramatic improvement in image sharpness and the near absence of cross color and dot crawl errors.

The method used to obtain Ycc and Ccc from three dimensions is illustrated in FIGS. 8*a* and 9*a*. The luminance filter is again a chrominance bandpass filter and either of two divisors, 128 or 64, may be applied to the sum of the weighted values. The chrominance filter is a lowpass filter with the sum of the weighted values being divided by 128. The chrominance value of the current pixel is then subtracted from this filter value to obtain Ccc. In both filters the vertical and horizontal characteristics are identical to the two-dimensional filters of FIGS. 1*a* and 5*a*. The temporal weighting of the luminance filter is (−1, 2, −1) and of the chrominance filter is (1, 2, 1). The heavily bordered frame in FIGS. 8*a* and 9*a* is the current frame, with the central pixel being the current pixel. Rather than process the 45 (3×5×3) pixels indicated simultaneously, the filter is broken down into a temporal filter, a vertical filter and a horizontal filter, beginning with the temporal filter as the most economical approach. The output of each subfilter feeds the subsequent subfilter, the output of the horizontal filter being the output of the three-dimensional filter. The values Ycv, Ych, Cfv, Cfh are obtained as before, and are joined by the temporal filter values Yct and Cft as illustrated in FIGS. 8*b* and 9*b*. Although again the Q chrominance component is illustrated, the filtering applies equally to the I chrominance components.

The decision process is changed somewhat since there are now three candidates for Ycx, i.e., Ycv, Ych, Yct. If Ycc is a negative number, then the most positive value from among the three candidates is selected for Ycx, otherwise the most negative value is selected for Ycx. The same logic applies to the selection of a value for Cfx from Cfv, Cfh, Cft. Ycx and Cfx are clipped by Ycc and Ccc, respectively, and zero exactly as for the two-dimensional prefiltering process. As before, the selection of Ccc may be forced to cause the chrominance signal to always be three-dimensionally lowpass filtered which is the best choice for broadcast applications. Otherwise chrominance filtering only occurs when the chrominance signal is diagonal and in motion. It is also possible to force the selection of Cfv which could be desirable depending upon the characteristics of the decoder to be used. Finally the capability of disabling temporal processing independently in the luminance and chrominance channels may be added to the encoder for versatility. For broadcast applications two-dimensional luminance processing in combination with three-dimensional chrominance filtering (Ccc selected) produces minimum artifacts on the widest range of monitors, including those equipped with the proposed non-adaptive three-dimensional chrominance bandpass filters.

Thus the present invention provides an improved digital encoder for an encoded video signal by prefiltering both luminance and chrominance signals in multi-dimensions, and correcting the luminance and chrominance signals where cross color and dot crawl errors would otherwise occur in the decoded image without any unnecessary loss of detail.

What is claimed is:

1. A method of encoding a luminance and two chrominance components representing a color video image into an encoded video signal comprising the steps of:

filtering the luminance component in multiple dimensions to produce a luminance limit signal that represents peaks and edges in the luminance component and to produce a luminance correction signal in each dimension;

correcting the luminance component as a function of the luminance limit signal and the luminance correction signals only where the peaks and edges occur to produce a prefiltered luminance component that compensates for cross color errors when the encoded video signal is decoded;

filtering each chrominance component in multiple dimensions to produce prefiltered chrominance components that compensate for peaks and edges in the chrominance components which produce dot crawl errors when the encoded video signal is decoded and that are the same as the corresponding chrominance components except where the edges occur; and combining the prefiltered luminance and chrominance components with appropriate synchronizing signals to produce the encoded video signal.

2. A method as recited in claim 1 wherein the luminance component filtering step comprises the steps of:

chrominance bandpass filtering the luminance component in multiple dimensions to produce the luminance limit signal; and lowpass filtering the luminance component in each dimension to produce the luminance correction signals.

3. A method as recited in claim 1 wherein the chrominance component filtering step comprises the steps of:

filtering each chrominance component to produce respective chrominance correction signals; and adding the chrominance correction signals to the corresponding chrominance components to produce the prefiltered chrominance components.

4. A method as recited in claim 1 wherein the chrominance component filtering step comprises the steps of:

filtering each chrominance component in multiple dimensions to produce respective chrominance color correction signals having values that represent the peaks and edges in each chrominance component; and adding the chrominance color correction signals to the corresponding chrominance components to produce the prefiltered chrominance components.

5. A method as recited in claim 1 wherein the correcting step comprises the steps of:

determining from the luminance correction signals and the luminance limit signal a final luminance correction signal; and adding the final luminance correction signal to the luminance component to produce the prefiltered luminance component.

6. A method as recited in claim 1 wherein the chrominance components filtering step comprises the steps of:

filtering each chrominance component in each dimension to produce respective chrominance limit signals having values representing the peaks and edges in each chrominance component and to produce respective chrominance correction signals in each dimension for each chrominance component; and correcting the corresponding chrominance components as a function of the respective chrominance limit signals and the chrominance correction signals to produce the prefiltered chrominance components.

7. A method as recited in claim 6 wherein the chrominance components correcting step comprises the steps of:

determining from the chrominance correction signals and the chrominance limit signal respective final chrominance correction signals for each chrominance component; and adding the final chrominance correction signals to the corresponding chrominance components to produce the prefiltered chrominance components.

8. An apparatus for encoding a luminance and two chrominance components representing a color video image into an encoded video signal comprising:

means for filtering the luminance component in multiple dimensions to produce a luminance limit signal that represents peaks and edges in the luminance component and to produce a luminance correction signal in each dimension;

means for correcting the luminance component as a function of the luminance limit signal and the luminance correction signals only where the peaks and edges occur to produce a prefiltered luminance component that compensates for cross color errors when the encoded video signal is decoded;

means for filtering each chrominance component in multiple dimensions to produce prefiltered chrominance components that compensate for peaks and edges in the chrominance components which produce dot crawl errors when the encoded video signal is decoded and that are the same as the corresponding chrominance components except where the edges occur; and means for combining the prefiltered luminance and chrominance components with appropriate synchronizing signals to produce the encoded video signal.

9. An apparatus as recited in claim 8 wherein the chrominance component filtering means comprises:

means for filtering each chrominance component to produce respective chrominance correction signals; and means for adding the chrominance correction signals to the corresponding chrominance components to produce the prefiltered chrominance components.

10. An apparatus as recited in claim 8 wherein the chrominance component filtering means comprises:

means for filtering each chrominance component in multiple dimensions to produce respective chrominance color correction signals having values that represent the peaks and edges in each chrominance component; and means for adding the chrominance color correction signals to the corresponding chrominance components to produce the prefiltered chrominance components.

11. An apparatus as recited in claim 8 wherein the luminance component filtering means comprises:

means for chrominance bandpass filtering the luminance component in multiple dimensions to produce the luminance limit signal; and means for lowpass filtering the luminance component in each dimension to produce the luminance correction signals.

12. An apparatus as recited in claim 8 wherein the correcting means comprises:

means for determining from the luminance correction signals and the luminance limit signal a final luminance correction signal; and means for adding the final luminance correction signal to the luminance component to produce the prefiltered luminance component.

13. An apparatus as recited in claim 8 wherein the chrominance components filtering means comprises:

means for filtering each chrominance component in each dimension to produce respective chrominance limit signals having values representing the peaks and edges in each chrominance component and to produce respective chrominance correction signals in each dimension for each chrominance component; and means for correcting the corresponding chrominance components as a function of the respective chrominance limit signals and the chrominance correction signals to produce the prefiltered chrominance components.

14. A method as recited in claim 13 wherein the chrominance components correcting means comprises:

means for determining from the chrominance correction signals and the chrominance limit signal respective final chrominance correction signals for each chrominance component; and means for adding the final chrominance correction signals to the corresponding chrominance components to produce the prefiltered chrominance components.

* * * * *